United States Patent [19]

Shimada et al.

[11] 4,276,347
[45] Jun. 30, 1981

[54] REINFORCED RESINOUS LAMINATE

[75] Inventors: Koji Shimada, Fujisawa; Seiji Koike, Yokosuka, both of Japan

[73] Assignees: Mitsui Petrochemical Industries, Ltd.; Kabushiki Kaisha Takeda Sangyo, both of Tokyo, Japan

[21] Appl. No.: 68,054

[22] Filed: Aug. 20, 1979

Related U.S. Application Data

[63] Continuation-in-part of Ser. No. 860,384, Dec. 14, 1977, abandoned.

[30] Foreign Application Priority Data

Dec. 25, 1976 [JP] Japan .................................. 51/178841

[51] Int. Cl.³ .................... B32B 7/00; B32B 27/06; B32B 27/32
[52] U.S. Cl. ................................ 428/332; 428/461; 428/910
[58] Field of Search ............. 428/461, 910, 457, 516, 428/332; 148/13, 159, 127

[56] References Cited

U.S. PATENT DOCUMENTS

| 3,220,891 | 11/1965 | Templeton et al. | 148/13 R |
| 3,271,287 | 9/1966 | Post | 148/13 R |
| 3,322,613 | 5/1967 | Rasmussen | 428/910 |
| 3,471,353 | 10/1969 | Rasmussen | 428/516 |
| 3,968,287 | 7/1976 | Balk | 428/910 |
| 4,064,302 | 12/1977 | Kozlowski et al. | 428/461 |
| 4,071,391 | 1/1978 | Hoberstroh et al. | 428/461 |

FOREIGN PATENT DOCUMENTS

| 2153589 | 4/1973 | France | 428/910 |
| 1316640 | 5/1973 | United Kingdom | 428/516 |

Primary Examiner—Paul J. Thibodeau
Attorney, Agent, or Firm—Burns, Doane, Swecker & Mathis

[57] ABSTRACT

A reinforced resinous laminate comprising at least two strips of thermoplastic film, at least one annealed aluminum foil interlaid between the strips, and adherent coating on either surface of the metal foil to bond the annealed aluminum foil and the strips together. The strips of thermoplastic film are oriented monoaxially and have the directions of orientation at an angle each other.

2 Claims, 3 Drawing Figures

REINFORCED RESINOUS LAMINATE

This application is a continuation-in-part application of our application Ser. No. 860,384, filed on Dec. 14, 1977, and now abandoned.

BACKGROUND OF THE INVENTION

This invention relates to reinforced thermoplastic film produced by laminating together at least two strips of oriented thermoplastic film each having the direction of orientation at an angle to each other and having at least one annealed aluminum foil interlaid between the strips with adhesion.

It has been known in the art to sandwich aluminum foil between strips of thermoplastic material for imparting shape stability or rigidity to a laminate as disclosed in U.S. Pat. No. 4,064,302. However, the conventional laminate is not often suitable for the uses intended for ordinary packaging articles, such as for example, bags for which a suitable flexibility and a rupturing resistance against an applied force are usually appreciated.

We have discovered that strips of a thermoplastic film which are lapped but not bonded together often exhibit a higher degree of rupturing resistance against an applied force than do such films which are bonded together. We have found, however, that by employing a reinforcing layer such as an annealed aluminum foil of suitable thickness, the reinforcing layer will rupture as a force of sufficient magnitude is applied thereto so as to provide the desired unbonded condition in certain portions of the laminate. The resulting unbonded areas of the laminate are found minute enough so that the decrease in reinforcing effectiveness of the layer is negligible, while at the same time greatly increasing the laminate's resistance to rupturing. The bonded condition, however, is required, at least initially, to provide the necessary reinforcement for the laminate.

SUMMARY OF THE INVENTION

A principal object of the invention therefore is to provide an improved resinous laminate formed of a plurality of mutually angularly oriented strips of thermoplastic film between which, with adhesion, is sandwiched at least one annealed aluminum foil of suitable thickness.

Another object of the invention is to provide an improved resinous laminate reinforced by the orientation of the component strips and being of moisture non-permeable character due to the interlaying of the annealed aluminum foil between the strips.

Still another object of the invention is to provide a resinous laminate reinforced by the orientation of the component strips and having at least one annealed aluminum foil so interlaid between the strips of resinous film as to be covered thereby on either surface of the annealed aluminum foil wherein the annealed aluminum foil is safeguarded against any external injury such as otherwise would occur in case of any slight touching with some bodies.

Still yet another object of the invention is to provide a resinous laminate reinforced by the orientation of the component strips and having a suitable plasticity due to the annealed aluminum foil interlaid between the strips of the film.

Further object of the invention is to provide a resinous laminate reinforced by the orientation of the component strips and having antistatic character due to the annealed aluminum foil interlaid between the strips.

Still further object of the invention is to provide a resinous laminate reinforced by the orientation of the component strips and due to the annealed aluminum foil with which the laminate is provided, with added convenience of the known heat seal technique to the users in making up into any prepared article form. The term "heat seal", as used herein, refers to heating thermoplastic resin for holding the same in its adherent state.

Thus, in the preferred embodiment of the invention, there are comprised at least two strips of thermoplastic film laminated together and having the directions of orientation disposed angularly to each other and at least one annealed aluminum foil interlaid between the strips with adhesion.

BRIEF DESCRIPTION OF THE DRAWING

For a complete understanding of the nature of this invention, reference is made to the following detailed description and drawing, in which.

DESCRIPTION OF THE PREFERRED EMBODIMENT

Figure 1:
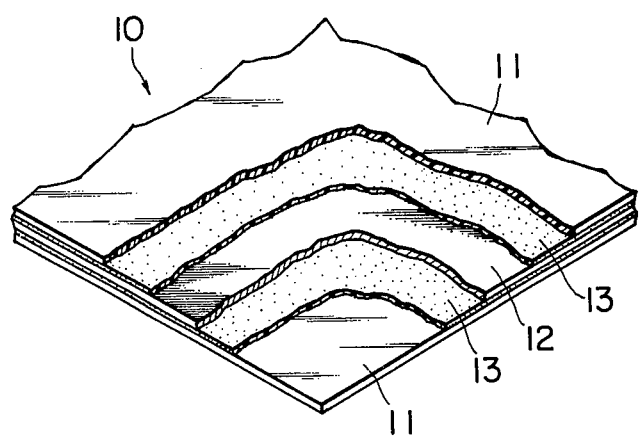
FIG. 1 is a perspective partially broken away view of a sheet obtained in accordance with this invention.

Referring to FIG. 1 of the drawing, there is shown sheet material 10 prepared in accordance with this invention. Two strips 11 of thermoplastic resin film, such as, for example, polyethylene film are laminated to an annealed aluminum foil, with a relatively thin adherent coating 13 of suitable resinous adhesive, such as polyethylene, on either surface of the metal foil 12.

The strips 11 are monoaxially oriented and are laminated with their directions of orientation at a considerable angle to each other, preferably at a right angle to each other. The aluminum foil 12 is interlaid between the strips 11 to adhere to the strips by means of adhesive coating 13 on either surface of the foil. The aluminum foil 12 is in advance annealed as hereinafter described in greater detail in order to attain to the principal quality of the product.

If the direction of orientation of each of the strips 11 is at approximately 45 degrees to the new longitudinal direction of the sheet 10, the directions of orientation will be at a right angle to each other and a relatively high tensile strength film will be thus obtained. In addition, the resultant sheet overcomes the low tear deficiencies of biaxially oriented films since any tear would always be in the high direction of one strip.

It is obvious of course that a similar laminated sheet could be made from two strips, one of which has been oriented substantially at right angles to its longitudinal direction and another strip which has been oriented in the longitudinal direction.

In actual test, the sheet 10 was separated into freely movable strips 11 subject to a certain value of the tensile loads. This may be safely attributed to tear or yield of the annealed aluminum foil 12 because of the fact that the same phenomenon was not exhibited against the same loads by the other sheet similarly propered except that no annealed aluminum foil is provided, the sheet thus being kept in firmly bonded condition.

The aluminum foil interlayer provides better permeability against moisture in practical use, particularly in package use for photographic sensitive film.

The sheet according to the invention further has various advantages as listed below.

While there have been in the art various laminates formed of metal foil and resinous film for moisture non-permeable purpose, it has been customary that the metal foil is exposed on one surface of the sheet. Since the aluminum foil usually tends to be torn or broken by a slight touch of sharp or tip like bodies. The resinous strips on either surface of the aluminum foil of the invention provides a proper covering means sufficient to safeguard the foil from such touch.

The annealed aluminum foil of the invention further provides a better flexibility which is defined as the desired plasticity such as is otherwise unobtainable by any pure resinous laminates having no annealed aluminum foil.

The aluminum foil of the invention still further provides better antistatic means for the sheet as will be apparent from the following Example.

The sheet according to the invention advantageously provides means for the sheet to be readily made up into any prepared form article by employing the popular "heat seal" technique as stated in the foregoing. This may be attributed to the metal foil which is not exposed externally of the sheet. In case of metal foil to metal foil adhesion, usage of a suitable adhesive is required and use of the additional adhesive entails extra handling of the adhesive materials with added inconvenience and expense to the user.

The above outlined and listed advantages and qualities of the sheet according to the invention will be further apparent from the following description of a method for manufacturing an aluminum foil suitable for the uses intended for the present invention together with various Examples.

EXAMPLE 1

Aluminum foils having a thickness of from 7 to 15 micron and about 4 to 6 kilo meter length were in the form of rolls, and suitable number of such rolls were heated in an annealing oven. The operating temperature in the oven was vaired in successive steps to increasing degrees of temperature, as follows. The temperature of 200° C. was increased in the oven in successive several steps up to a final temperature step of 400° C. and was kept constant by a temperature control for about 48 hours, and thereafter they were exposed to the ambient temperature. The entire time period during which the temperatures were applied was 72 hours. The quality of the product was examined in the following test, by means of testing machines. The samples had a size of 100 mm length and 10 mm width.
Test 1: Measurement of the tensile strength
Test 2: Measurement of the elongation rate:
Test 3: Measurement of durability against bending or folding.

The experimental results of the above tests 1–3 are given below in the table 1, compared with a non-annealed sample of the same size.

TABLE 1

|  | Tensile Strength | Elongation | Durability |
| --- | --- | --- | --- |
| Annealed Sample | 7.2–7.4 Kg/mm$^2$ | 2–4% | 1.7–2.0 |
| Non-Annealed Sample | 17.1–20.8 Kg/mm$^2$ | 0.5–1.8% | 3.1–3.4 |

Note: Durability - Number of bendings against which the sample can be durable until the sample is broken.
Note: Elongation - Ratio of a difference between lengths before and after elongation, respectively, divided by the original length From the above table it will be understood or observed that the sample of the present invention has less tensile strength, and less durability against the bending but has a larger elongation ability. This is very much appreciable in order to attain to the quality intended for uses for the present invention.

EXAMPLE 2

Two high density polyethylene strips mixed with carbon black extruded from a die into films of 45 micron thickness and monoaxially oriented at the orientation temperature, through means of ordinally apparatus. Two of the resultant films are laminated with aluminum foil which has experienced the annealing treatment, having 7 micron thickness, interlaid between the strips with adherent coating of low density polyethylene resin in its adherent state, on either surface of the foil, the manufacturing stage. The direction of orientation of each of the films is at approximately 45 degrees to the new longitudinal direction of the resultant sheet so that the directions of orientation of the two strips of film will be at a right angle to each other; a relatively high tensile strength film will be thus obtained.

EXAMPLE 3

Another laminated sheet was prepared completely in similar manner to that of Example 2 except that no annealed aluminum foil was interlaid between the two orientated films.

Comparative Test

Each of the above prepared two laminated sheets is prepared into a ribbon form of 10 mm by 100 mm size. To the ribbon of sheet of Example 2 and the ribbon of sheet of Example 3 are respectively applied tensile loads of a certain value. Representation of relationship between the tensile load and resultant elongation or strain is referred to as S-S curve as herein used, and represented graphically in FIGS. 2 and 3.

Figure 2:
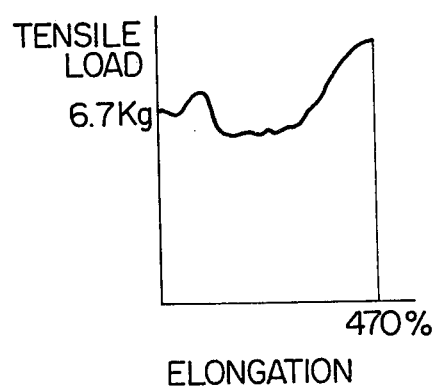
FIG. 2 is a graphical representation of the character of the sheet of the present invention.
Figure 3:
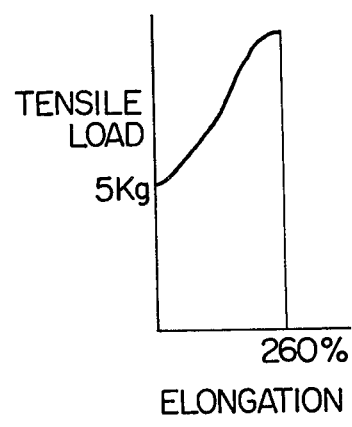
FIG. 3 is a similar representation to that of FIG. 2 of conventional laminates of similar type.

The graph of FIG. 2 represents the S-S curve of the sheet ribbon of Example 2 while the graph of FIG. 3 represents the S-S curve of the sheet ribbon of Example 3.

As is evident from FIG. 2, the S-S curve of the sheet ribbon of Example 2 has proven its elongation to occur under 6.7 Kg load and to continue up to the rate of 470 percent elongation while keeping non-yielding ability at such rate of elongation, whereas S-S curve of Example 3 has proven its elongation to occur under comparatively lower load 5 Kg and to promptly increase its elongation rate up to the rate of 260 percent elongation; at that stage the ribbon is broken or yields.

Antistatic Test

The sheet of the present invention was rubbed with a wool fabric under pressure about 50 times of reciprocation. Immediately thereafter, new dry ash powder of smoked tobacco was applied to the sheet. The test showed no electrostatic attraction of the sheet to the ash.

Similar testing was applied to the sheet of Example 3, but the rubbing was decreased to about 4 to 5 times reciprocations. Nevertheless, the sheet exhibited a comparatively strong attraction relative to the ash and the ash was completely attracted to the sheet as the same approaches the ash.

Plasticity Test

The sheet of Example 2 of suitable size was folded back by handwork and then freed until elastic recovering motion of the sheet completely ceases. The residual angular strain measured 30 degrees while the sheet of Example 3 measured 90 degrees under the similar test.

It will be obvious from the test that the sheet of Example 2 has a less restoring or elestically recovering ability, namely a larger plasticity character than the sheet of Example 2.

Moisture Non-Permeability Test

The test result of the resinous laminates under application for the water vapor transmission is in accordance with the method specified in Japanese Industrial Standard Z-0208. The testing method for determination of water vapor rate of moisture-proof packaging material of Example 2, has proven its transmission rate of merely 0.8 g/m$^2$/24 hours against 3.4 g/m$^2$/24 hours of material of Example 3.

It is obvious of course that the moisture non-permeability could be increased by increasing the thickness of the annealed aluminum foil.

What is claimed is:

1. A reinforced laminate comprising two strips of polyethylene film, a strip of annealed aluminum foil of between about 7 to 15 microns in thickness interlaid between the strips, an adherent coating on both surfaces of the annealed aluminum foil to bond the annealed aluminum foil and the polyethylene strips together, the polyethylene strips each being oriented at an angle of 45 degrees to the longitudinal direction of the laminate and forming a ninety degree angle relative to one another.

2. The laminate of claim 1 wherein the thickness of the aluminum foil is about 7 microns and the thickness of each of said strips of polyethylene film is about 45 microns.

* * * * *